Dec. 2, 1969  J. C. HOUDA, JR  3,482,074
PERCUSSION WELDING APPARATUS
Filed May 11, 1966  3 Sheets-Sheet 1
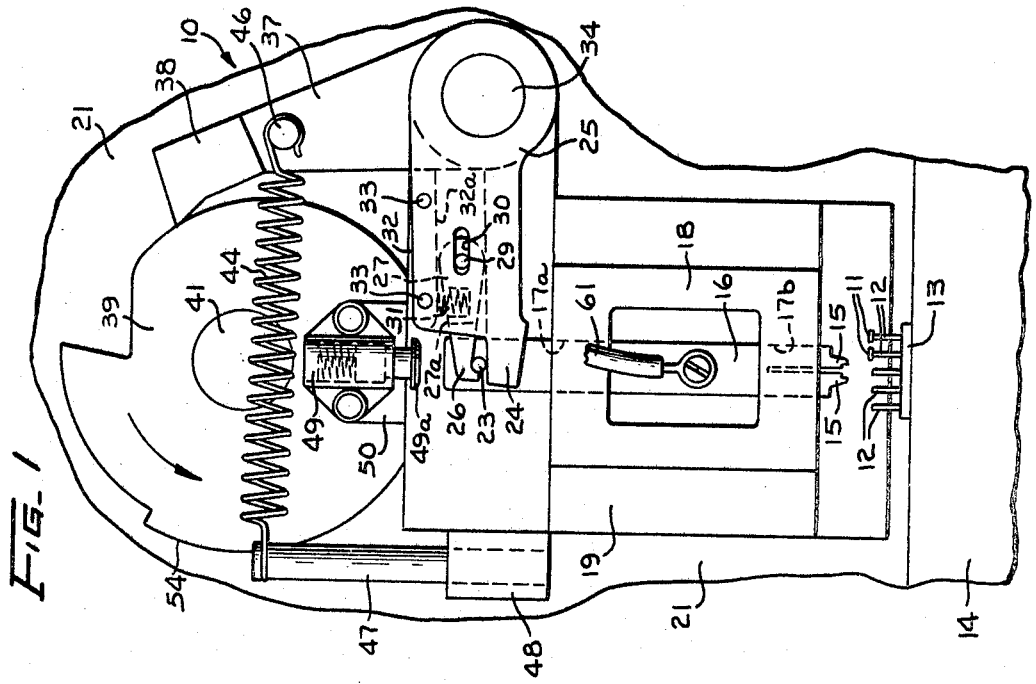
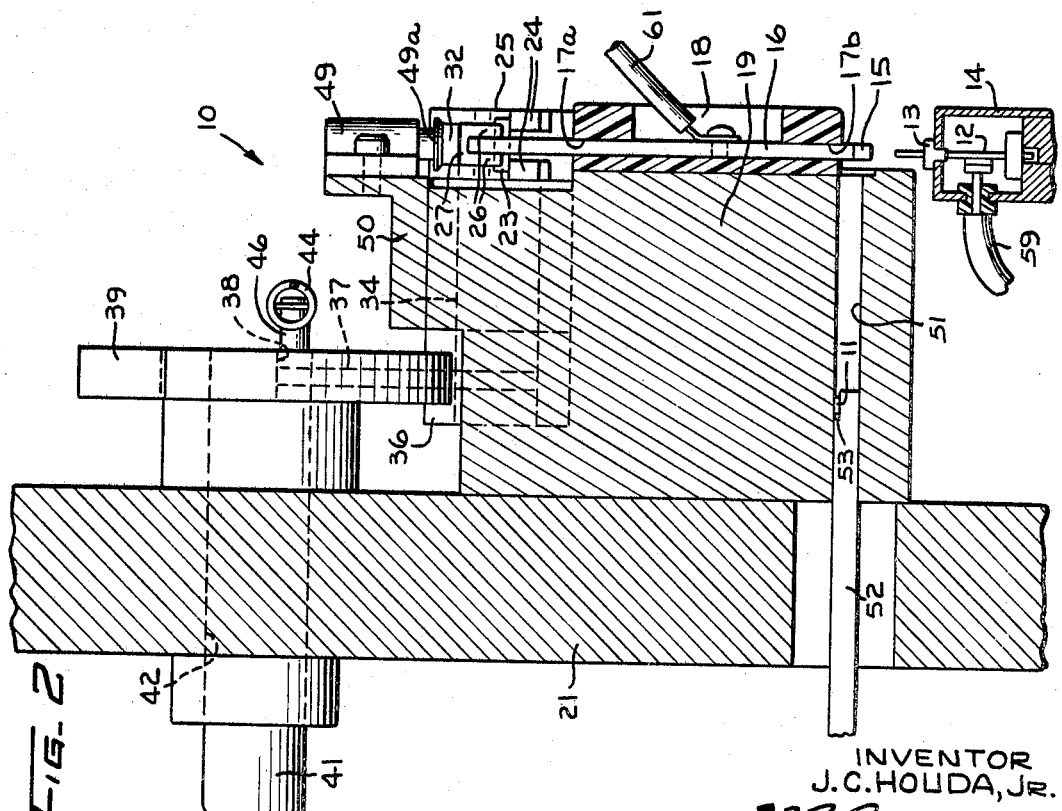
INVENTOR
J.C. HOUDA, Jr.
BY
ATTORNEY

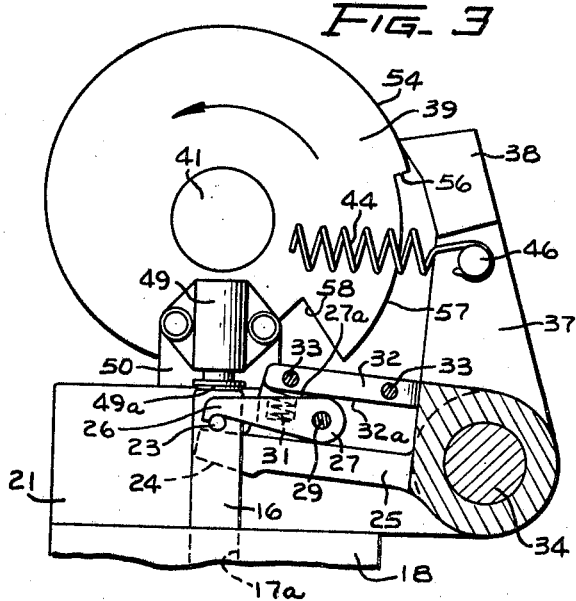
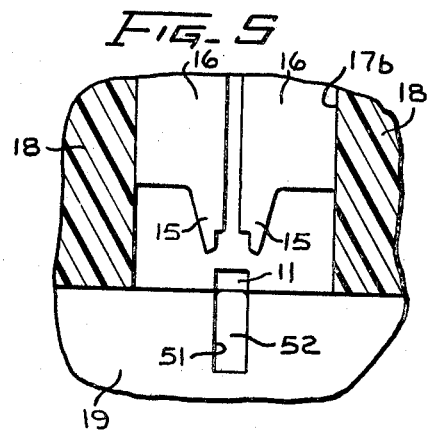
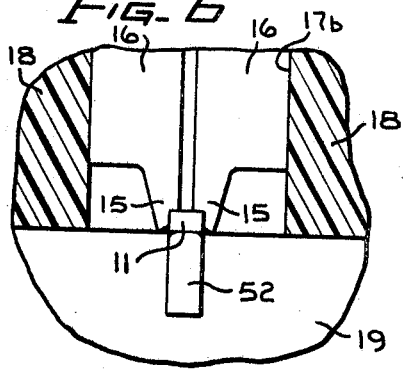
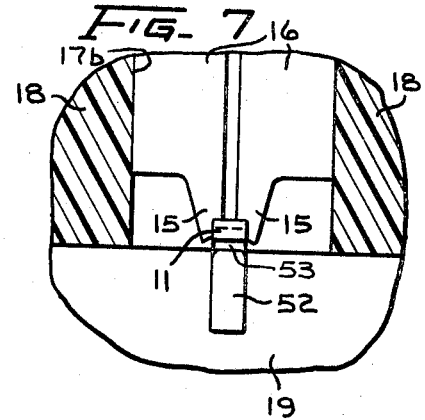
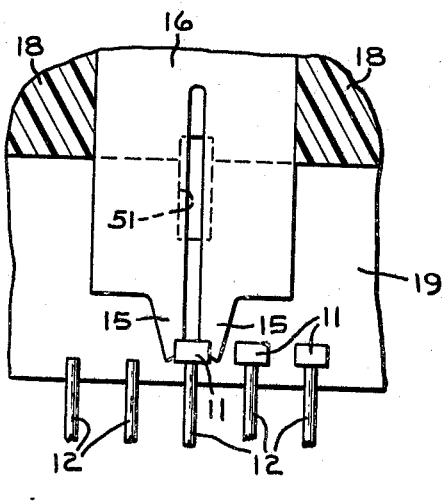

Dec. 2, 1969  J. C. HOUDA, JR  3,482,074
PERCUSSION WELDING APPARATUS
Filed May 11, 1966  3 Sheets-Sheet 3
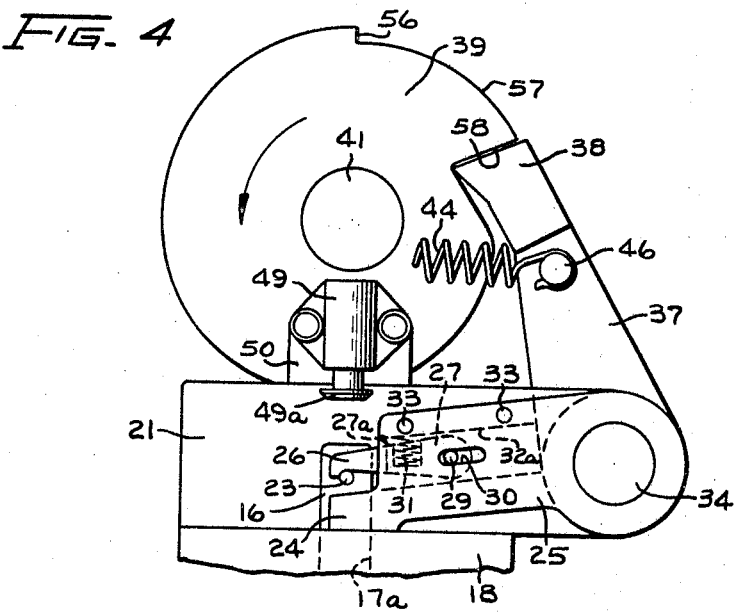

United States Patent Office 3,482,074
Patented Dec. 2, 1969

3,482,074
PERCUSSION WELDING APPARATUS
James C. Houda, Jr., Downers Grove, Ill., assignor to Western Electric Company, Incorporated, New York, N.Y., a corporation of New York
Filed May 11, 1966, Ser. No. 549,324
Int. Cl. B23k 9/22
U.S. Cl. 219—95                                    8 Claims

ABSTRACT OF THE DISCLOSURE

Apparatus is provided for percussively welding an element onto a part wherein a welding electrode is supported for reciprocal movement along a predetermined path. Dual driving mechanisms provide separate propelling forces to the welding electrode for picking up and welding the elements.

This invention relates to percussion welding apparatus and, more particularly, to an improvement of such welding apparatus wherein dual driving mechanisms are provided for utilization with the welding electrode of the apparatus. It is an object of this invention to provide an improved percussion welding apparatus of such character.

In many percussion welding apparatus, as typified by the one shown in Patent No. 2,809,274, issued Oct. 8, 1957, to A. L. Quinlan, a percussion welding electrode is mounted in a guideway wherein it is reciprocated along a predetermined path between first and second retracted and advanced positions successively during a cycle of operation of the apparatus. Such movement allows the electrode initially to pick up a precious metal contact and thereafter to bring the contact into percussive welding engagement with a metal part.

More particularly, the welding electrode is initially propelled along the predetermined path from its first retracted position to its first advanced position by a suitable drive mechanism so that the forward end of the welding electrode, bifurcated and recessed so as to provide a pair of fingers for picking up the metal contact, is driven securely over the contact. The contact is positioned in the path of travel of the electrode by a suitable contact positioning mechanism. After picking up the metal contact, the welding electrode is retracted to its second retracted position and the contact transfer mechanism is withdrawn from the path of travel of the electrode. Then, the same drive mechanism which is employed to propel the electrode to its first advanced position for a contact pickup operation is again employed to propel the electrode along its predetermined path from its second retracted position to its second advanced position whereat the electrode brings the metal contact securely held thereby into percussive welding engagement with the metal part.

In the above described type of welding apparatus, only a single drive mechanism is employed to propel the welding electrode along its predetermined path of movement for both the contact pickup operation and the percussion welding operation. Such a percussion welding apparatus allows no flexibility in selectively adjusting the amount of driving force applied to the welding electrode during the two independent operations. In many applications, this may impose compromises on the operating performance of and end results realized with a given apparatus, especially when the amount of driving force required for the two independent operations in question ideally should be substantially different. For example, in one particular application it was found that the force required to propel the pickup fingers of the electrode over the metal contact was much greater than the force required to propel the electrode and the contact carried thereby into percussive welding engagement with the small cross sectional area of an extending wire finger of a piece part.

Accordingly, it is another object of this invention to provide an improved percussion welding apparatus wherein independent driving forces are utilized selectively for propelling a welding electrode of the apparatus during a contact pickup operation and during a percussion welding operation.

It is still another object of this invention to provide an improved percussion welding apparatus which utilizes a first drive mechanism for propelling a welding electrode of the apparatus during a contact pickup operation and a second drive mechanism for propelling the electrode during a percussion welding operation.

It is a further object of this invention to provide an improved percussion welding apparatus which has mechanisms for selectively applying to a welding electrode of the apparatus different driving forces during a contact pickup operation and a percussion welding operation of the apparatus, which driving forces may be readily selected to suit the force requirements necessary for the particular operation.

It is a further object of this invention to provide an improved percussion welding apparatus which is simple in operation, effective in use and relatively inexpensive to construct.

In accordance with a preferred embodiment of this invention, a percussion welding apparatus includes a welding electrode which is supported for reciprocal movement along a predetermined path initially between first retracted and advanced positions, and subsequently between second retracted and advanced positions, by first and second driving mechanisms, respectively. The driving mechanisms are interconnected with the welding electrode in such a manner that the first driving mechanism provides the driving force for propelling the welding electrode along its predetermined path toward its first advanced position for a contact or element pickup operation, and the second driving mechanism provides the driving force for propelling the welding electrode along its predetermined path toward its second advanced position for a percussion welding operation.

This invention, together with further objects and advantages thereof, will best be understood by reference to the following description taken in conjunction with the accompanying drawings in which:

FIG. 1 is a front elevation view of the welding apparatus;

FIG. 2 is a side elevation view, mainly in cross section, of the welding apparatus;

FIG. 3 is a front elevation view of a portion of the welding apparatus showing the portion thereof prior to a contact pickup operation;

FIG. 4 is a front elevation view of a portion of the welding apparatus showing the portion thereof during a percussion welding operatoin;

FIGS. 5–8 are enlarged views showing the welding electrode of the apparatus during various portions of a cycle of operation of the apparatus; and FIG. 9 is an enlarged, isometric view of a portion of the apparatus employed in driving the welding electrode.

The preferred embodiment of the improved percussion welding apparatus of this invention is hereinafter described in conjunction with the manufacture of a particular electrical device, namely, a wire spring relay. It is to be understood, however, that the apparatus may be employed wherever it is desired to percussively weld a metal contact to a metallic portion of an article.

With reference to FIGS. 1 and 2 of the associated drawings, the percussion welding apparatus, generally designated by the numeral 10, is shown in a position it assumes shortly after the initiation of a cycle of operation of the apparatus. The welding apparatus 10 is used to percussively weld small precious metal contacts 11, in single time sequence, onto extending wire fingers 12 of a relay part 13. As best seen in FIG. 2, a feed track 14 is provided which has suitable mechanism (not shown) contained therein for indexing the relay part 13 in such a manner that upon each new cycle of operation of the welding apparatus 10, one of the wire fingers 12 is positioned directly beneath and in alignment with a pair of bifurcated pickup fingers 15 of a welding electrode 16 of the apparatus 10. Since the mechanisms for indexing the relay part 13 in timed sequence with the operation of the welding apparatus 10 is conventional in nature and is not a part of this invention, no detailed description thereof is set forth herein.

The welding electrode 16 is mounted for reciprocal movement along an upper guide portion 17a and a lower guide portion 17b of a guideway defining member 18. The member 18 is secured to a suitable mounting block 19 which, in turn, is secured to a base member 21. Also, the guideway defining member 18 is constructed of beryllium copper so that the welding apparatus 10 does not become permanently magnetized as the result of a series of welding currents being applied to the electrode 16.

Above the upper guide portion 17a, the welding electrode 16 has a cross pin 23 secured to and extending perpendicularly from front and rear surfaces thereof. Beneath the cross pin 23, on each side of the electrode 16, there is located a nose portion 24 of a first lever 25 (best seen in FIG. 9). Above the cross pin 23, on each side of the electrode 16, there is located a nose portion 26 of a second lever 27. The second lever 27 is received within a recessed portion 28 of and pivotally secured to the first lever 25 by means of a pivot pin 29 which is movable along a slot 30 of the first lever 25. A dampening spring 31, positioned between a plate 32 and the second lever 27 (best seen in FIG. 9), biases the second lever 27 about the pivot pin 29 in a direction toward the nose portions 24 of the first lever 25. The plate 32 is held in the recessed portion 28 of the first lever 25 by means of two pins 33.

The first lever 25 is secured to one end of a shaft 34 suitably supported for rotational movement in the mounting block 19 (FIG. 2). The other end of the shaft 34 is secured to a circular collar member 36 which in turn supports a cam follower 37. A forward end 38 of the cam follower 37 rides on the peripheral surface of a cam 39 driven by appropriate means through a shaft 41, the shaft 41 being rotatably received in a suitable passage 42 defined in the base member 21 and a supporting member 43. The cam follower 37 is held in engagement with the cam 39 by a spring 44 which is secured at one end to a pin 46 affixed to the cam follower 37, and is secured at the other end to an upstanding post 47 affixed to a projecting portion 48 of the mounting block 19.

Directly above the welding electrode 16, as viewed in FIGS. 1 and 2, a spring plunger assembly 49 is secured to an upstanding portion 50 of the mounting block 19. The plunger portion 49a of the spring plunger assembly 49 is engaged and compressed by upward movement of the welding electrode 16 and is utilized for propelling the welding electrode downward during a portion of the cycle of operation of the percussion welding apparatus 10.

As best viewed in FIG. 2, there is a guide passage 51 located in the lower portion of the mounting block 19. This guide passage receives, for reciprocal movement therein by suitable means (not shown), a transfer finger 52. The transfer finger 52 is reciprocated from a retracted position in alignment with a shear mechanism (not shown), for shearing individual contacts 11 from a continuous supply of contact material, to an advanced position whereat a forward portion 53 of the transfer finger 52 positions the precious metal contact 11 carried thereon in the predetermined path of travel of the electrode 16. The means for reciprocating the transfer finger 52 and the means for shearing individual contacts 11 from a continuous supply of contact material may take the form of any of the well known mechanisms known to those skilled in the art. Thus, there is no detailed showing or description of these means given herein.

With a general description of the various individual elements making up the percussion welding apparatus 10 of this invention having been set forth above, a detailed discussion will now be given of the welding apparatus during a cycle of operation thereof. It will be assumed, for the sake of this description, that the cycle of operation of the welding apparatus 10 is commenced at a time when the welding apparatus has just completed a percussion welding operation.

As a general introduction to the cycle of operation of the percussion welding apparatus 10, the operational cycle thereof is as follows: the welding electrode is retracted to a first retracted position, the welding electrode is then propelled to a first advanced position whereat the bifurcated fingers of the electrode pick up a contact; the welding electrode is thereafter retracted to a second retracted position; and finally the welding electrode is propelled to a second advanced position whereat the percussion welding operation is effectuated.

FIGS. 5–8 of the associated drawings best depict the various positions of the lower bifurcated end of the welding electrode 16 of the percussion welding apparatus 10 of this invention during the operational cycle of the apparatus.

In FIG. 5, the welding electrode 16 is shown in a position wherein it has just been raised from a percussion welding operation, which position is achieved just after the beginning of a cycle of operation of the welding apparatus 10. The raising of the electrode 16 is effected by a gradual increasing peripheral portion 54 of the cam 39 (FIG. 3), which portion pivots the cam follower 37 against the bias of the spring 44 about the shaft 34 to the right as viewed in FIG. 3. When the cam follower 37 is moved in such a direction, the two nose portions 24 of the first lever 25 are moved upwardly into contact with respective underneath portions of the cross pin 23 of the electrode 16 whereby the electrode is drawn upwardly from the welding position during continued pivoting of the cam follower 37 to the right as viewed in FIG. 3.

As also best seen in FIG. 3, the upward movement of the electrode 16, during this portion of the cycle of operation of the welding apparatus 10, brings the top portion of the electrode into engagement with the plunger portion 49a of the spring plunger assembly 49, whereby the latter is compressed. As the plunger assembly 49 is compressed it applies a force to the welding electrode 16 in a downward direction. This force is not effective to move the electrode, however, as the electrode is held against such movement by the continued engagement of the nose portions 24 of the first lever 25 with the cross pin 23.

Also, during this initial movement of the electrode 16 to its first retracted position by a pivoting of the first lever 25 to its first retracted position, the transfer finger 52 (as best viewed in FIG. 2) is advanced through the guide passage 51 of the mounting block 19 to position a precious metal contact 11 in the predetermined path of travel of the electrode 16 in the guideway 18. The contact 11 is positioned by the transfer finger directly below and in alignment with the downwardly extending, bifurcated pickup fingers 15 of the now retracted welding electrode 16.

After the advance of the transfer finger 52 to position a contact 11 in alignment with the welding electrode 16, the forward portion 38 of the cam follower 37 drops off a shallow cutback portion 56 (FIG. 3) of the cam 39 whereby, through the pulling action exerted on the cam follower 37 by the spring 44, the nose portions 24 of the first lever 25 are pivoted rapidly counterclockwise out of engagement with respective portions of the cross pin 23 secured to the welding electrode 16. The nose portions 26 of the second lever 27 are not effective to apply a significant downward force on the cross pin 23 of the electrode 16 at this time, however, because there is sufficient space between the underside 32a of the plate 32 and the mutually opposed upper surface 27a of the lever 27, to allow relative movement between the two levers 25 and 27. Such movement does result in the compression of the spring 31 positioned between the two levers, but this spring by itself, is of insufficient resiliency to impart downward movement to the welding electrode.

Accordingly, with the forward portion 38 of the cam follower resting in the cutback portion 56 of the cam 39, i.e., just a fractional part of the operating cycle later than evidenced by the position of the various parts of the welding apparatus depicted in FIG. 3, the spring plunger assembly 49 is compressed as described above by initial movement of the welding electrode 16 to its first retracted position. As such, the spring plunger assembly 49 is the only effective source of a first driving force, upon disengagement of the nose portions 24 of the first lever 25 from the pin 23 for the first time during a cycle of operation of the apparatus, to propel the electrode 16 downwardly so that the bifurcated fingers 15 thereof are driven securely over a contact 11 positioned by the transfer finger 52 in the predetermined path of travel of the electrode 16. The pickup operation is illustrated in FIG. 6 and when the welding electrode 16 is at this position it is in its first advanced position.

The spring plunger assembly 49, as described in conjunction with the preferred embodiment of this invention, applies approximately ten pounds of driving force to the electrode 16 to propel the electrode along its predetermined path from the first retracted position to the first advanced position for the contact pickup operation. The amount of force applied to the electrode insures that the pickup fingers 15 thereof are driven securely over the contact 11 positioned in the path of travel by the transfer finger 52.

Now with particular reference to FIGS. 4 and 7, a second gradual raising portion 57 of the cam 39 is effective to again pivot the nose portions 24 of the first lever 25 into contact with the associated, underneath surfaces of the cross pin 23 secured to the welding electrode 16. The welding electrode 16 is thus raised a sufficient distance such that its bifurcated fingers 15 lift the contact 11 from the transfer finger 52 (see FIG. 7). The transfer finger 52 is thereafter retracted by suitable mechanism (not shown) from its position below the electrode 16. The first lever 25 at this time retracts the electrode 16 to its second retracted position, which second position is spaced from and below the first retracted position of the welding electrode 16 whereby the spring plunger assembly 49 is not effectively compressed as was the case by the first retraction of the electrode.

Now with reference to FIGS. 4 and 8, the welding of the precious metal contact 11 to the extending wire finger 12 of the relay part 13 is effectuated by the movement of the forward portion 38 of the cam follower 37 over a second larger cutback portion 58 of the cam 39 as rotation of the cam continues. Through such action, the nose portions 24 of the first lever 25 are again rapidly pivoted downwardly out of engagement with the associated, underneath surfaces of the cross pin 23 of the electrode 16. However, the cutback portion 58 of the cam 39 is greater in depth than the cutback portion 56 of the cam which results in the first lever 25 pivoting counterclockwise out of engagement with the pin 23 through a larger arc than was effected by the cutback cam portion 56. This initially results in the second lever 27, in response to the force applied to the cam follower 37 by the spring 44, initially compressing the spring 31 between the two levers. Immediately thereafter, the lower surface 32a of the plate 32 of the lever 25 drives against the upper surface 27a of the lever 27. When this happens the second lever is pivoted counterclockwise with the first lever 25. As a result, the two nose portions 26 of the second lever 27 drivingly engage the respective upper surfaces of the cross pin 23 secured to the electrode 16 so as to propel the electrode downward along the guide portions 17a and 17b of the passageway defining member 18 to its second advanced position. At the second advanced position of the electrode 16, the contact 11 carried thereby is brought into percussive welding engagement with the selected, projecting wire finger 12 of the relay part 13.

The small spring 31, positioned between the first and second levers 25 and 27, is effective in its compressed state, as during the percussion welding operation, to reduce effectively the rebound of the electrode 16 during the welding operation.

With the electrode 16 having been driven to its second advanced position to perform a percussion welding operation, a new cycle of operation of the apparatus is thereafter initiated and carried out as described hereinabove. More specifically, the new cycle starts by retracting the welding electrode 16 to its first retracted position and indexing the relay part 13 so as to present its next wire spring finger 12 below and in alignment with the path of travel of the welding electrodes 16.

The spring 44, as described in conjunction with the preferred embodiment of this invention, applies approximately two pounds of driving force to the cam follower 37 and thus approximately the same amount of force is applied to the electrode 16 to propel the electrode along its predetermined path from the second retracted position to the second advanced position for the percussion welding operation. The amount of force applied to the electrode at this time insures that the contact 11 is propelled against the spring finger 12 with sufficient force for a percussion welding operation but with insufficient force to cause damage to the contact 11 or bending of the spring finger 12.

Welding current from a standard power supply (not shown) is supplied for the percussive welding operation by means of a lead 59 (FIG. 2) associated with the individual spring finger 12 of the miniature relay part 13. The return path to ground for the welding current is provided by a lead 61 attached to the welding electrode 16. Since the method of effecting and the apparatus for performing a percussion welding operation are known to those skilled in the art, no detailed discussion thereof are presented herein.

There has been disclosed herein an improved percussion welding apparatus wherein independent driving forces are utilized selectively for propelling a welding electrode of the apparatus during a contact pickup operation and during a percussion welding operation. More particularly, the improved percussion welding apparatus utilizes a first drive mechanism for propelling the welding electrode thereof during the contact pickup operation and a second drive mechanism for propelling the electrode during the percussion welding operation. The amount of force provided by the two drive mechanisms for propelling the welding electrode are independently controlled such that varied driving forces may be applied to the welding electrode of the apparatus during the different operations thereof.

While one preferred embodiment of the improved percussion welding apparatus of this invention has been disclosed herein, many modifications will be apparent, and it is intended that the invention be interpreted as including all modifications which fall within the true spirit and scope thereof.

What is claimed is:

1. In an apparatus for percussively welding an element onto a part wherein a welding electrode is supported for reciprocal movement along a predetermined path between retracted and advanced positions and said electrode having an element pick up means, the improvement which comprises:

means for moving the electrode periodically from advanced to retracted positions along said predetermined path and for releasing it each time while in a retracted position;

first drive means rendered effective upon the first release of said electrode in the retracted position for propelling said electrode downwardly along said path to perform an element pickup operation; and second separate drive means rendered effective upon the second release of said electrode in the retracted position for propelling said electrode downwardly along said path to perform a welding operation.

2. In an apparatus for percussively welding a metal contact onto a part wherein a base is provided which defines in part a guideway, wherein retractable means are provided for positioning the contact at a point along the length of the guideway and wherein means are provided for positioning the part at a point spaced from one end of but aligned with the guideway, the improvement which comprises:

a welding electrode having means for supporting the contact along one end region thereof, said electrode being mounted in the guideway for reciprocal movement therealong between first and second advance and retracted positions, said first and second advanced positions being respectively associated with the point along the guideway whereat the contact is positioned by the retractable means and the point spaced from one end of the guideway whereat the part is positioned by the positioning means;

means mounted on the base for periodically engaging said electrode at a position spaced from the contact supporting end thereof and, upon alternate engagements therewith, for respectively moving said electrode to its first and second retracted positions, said means rapidly disengaging itself from said electrode before and at least just prior to movement of said electrode to either of its advanced positions;

driving means mounted on the base for propelling said electrode forwardly along the guideway to its first advanced position when said engaging and moving means is disengaged from said electrode after moving said electrode to its first retracted position; and second means mounted on said engaging and moving means for drivingly engaging said electrode and for propelling said electrode forwardly along the guideway to its second advanced position in response to said engaging and moving means becoming disengaged from said electrode after moving said electrode to its second retracted position.

3. In an apparatus for percussively welding a metal contact onto a part wherein a base is provided which defines in part a guideway, wherein retractable means are provided for positioning the contact at a point along the length of the guideway and wherein means are provided for positioning the part at a point spaced from one end of but aligned with the guideway, the improvement which comprises:

a welding electrode having means for supporting the contact at one end thereof, said electrode being mounted in the guideway for reciprocal movement therealong between first and second advanced and retracted positions, said first and second advanced positions being respectively associated with the point along the guideway whereat the contact is positioned by the retractable means and the point spaced from the one end of the guideway whereat the part is positioned by the positioning means;

first means mounted on the base and movable into engagement with said electrode at a position spaced from the contact supporting end thereof, and upon being moved into alternate engagements therewith, for respectively moving said electrode to its first and second retracted positions, said first means being movable out of engagement with said electrode during movement of said electrode to its advanced positions;

first driving means mounted on the base for propelling said electrode forwardly along the guideway to its first advanced position in response to said first means being moved out of engagement with said electrode while said electrode is in its first retracted position;

second means mounted on said first means for drivingly engaging said electrode and for propelling said electrode forwardly along the guideway to its second advanced position in response to said first means being moved out of engagement with said electrode while said electrode is in its second retracted position; and second driving means mounted on the base for periodically moving said first means into and out of engagement with said electrode so that said electrode is alternately moved to and released from its first and second retracted positions sequentially during a single cycle of operation of the welding apparatus.

4. In an apparatus for percussively welding a metal contact onto a part wherein a base is provided which defines in part a guideway, wherein retractable means are provided for positioning the contact at a point along the length of the guideway and wherein means are provided for positioning the part at a point spaced from one end of but aligned with the guideway, the improvement which comprises:

a welding electrode having bifurcated fingers at one end thereof and a cross pin near the other end thereof, said electrode being mounted in the guideway for reciprocal movement therealong between first and second advanced and retracted positions, said first and second advanced positions being respectively associated with the point along the guideway whereat the contact is positioned by the retractable means and the point spaced from the one end of the guideway whereat the part is positioned by the positioning means;

a first lever mounted on the base for pivotable movement, said first lever being pivotable in a first direction to engage said cross pin of said electrode, and to move said electrode upon alternate engagements therewith along the guideway respectively to its first and second retracted positions, said first lever also being pivotable in a second direction away from engagement with said cross pin of said electrode;

first driving means mounted on the base for propelling said electrode forwardly along the guideway to its first advanced position in response to said first lever being pivoted out of engagement with said electrode while said electrode is in its first retracted position whereby said bifurcated fingers of said electrode are driven securely over a contact positioned in the guideway;

a second lever both pivotably mounted on and resiliently interconnected with said first lever and movable into operable engagement with said cross pin of said electrode to drive said electrode along the guideway to its second advanced position in response to said first lever being pivoted out of engagement with said electrode while said electrode is in its second retracted position and when said resilient interconnection between said first and second levers is compressed whereby the contact is brought into percussive welding engagement with the part; and second driving means mounted on the base for periodically pivoting said first lever in its two directions twice during each cycle of operation of the welding apparatus so that said electrode is in sequence moved to its first retracted position by said first lever, propelled to its first advanced position by said first driving means, moved to its second retracted position by said first lever and propelled to its second advanced position by said second lever.

5. A percussive welding apparatus in accordance with claim 4 wherein said first and said second driving means are springs selected in such a manner that the independent driving forces imparted thereby to the apparatus respectively associated therewith are controlled to meet the requirements of the independent operations thereof in initially picking up a contact and thereafter percussively welding the contact to a part.

6. In a device for percussively welding a first article to a second article using a movable electrode;
- a rotary cam means having a pair of lobes, the first higher than the second, alternately spaced with a pair of drop offs, the first shallower than the second;
- a spring means;
- a first lever having a first end engaging said cam surface and a second end supporting and moving the electrode upwards to compress said spring means when said first lobe contacts said first lever and positioning the electrode below said spring means upon contacting said second lobe;
- a pair of resilient fingers attached to the electrode to pick up the first article as the electrode is propelled downward by said spring means upon release of said first lever in response to said first drop off;
- a second lever pivotally mounted on and engaged by said first lever for engaging and projecting the electrode downwards; and
- means rendered effective as said second drop off releases said first lever for forcibly contacting said second lever to propel said electrode and the first article thereon into percussive engagement with said second article.

7. In an apparatus for picking up and percussively welding articles:
- an electrode means having article pick up facilities;
- a first spring means for engaging said electrode means and driving said electrode means to pick up an article;
- a first lever having a first end for engaging and lifting said electrode means to compress said first spring;
- a second lever mounted on the first lever for engaging and moving said electrode means to percussively weld a picked up article;
- a second spring interconnecting said first and second levers for urging said second lever into engagement with said electrode;
- a rotating cam means having a pair of lobes and a pair of drop offs engaging the second end of the first lever for successively reciprocating said electrode means to compress said first spring means on alternate reciprocations; and
- means urging said second end of said first lever into engagement with said cam means to present said drop offs to said first lever for sequentially driving said electrode means downwardly under the influence of said first spring means and then said urging means.

8. In a percussion welding device having a movable electrode:
- a drive means comprising a plunger and a drive spring;
- a lever arrangement comprising a first lever and a second lever pivotally mounted within said first lever with said second lever engaging the electrode and the first end of said first lever supporting said electrode;
- a cam;
- a cam follower having a first end contacting the surface of said cam with a second end fixedly connected to the second end of said first lever;
- a tension spring with a first end fixed and a second end connected to said cam follower;
- means for rotating said cam;
- a first high spot on said cam to urge said cam follower outward and said first end of said first lever upward, forcing the electrode against said plunger to compress said drive spring;
- a shallow shoulder on said cam for releasing said cam follower to render effective said tension spring to pull said follower inward to remove said first lever from support of the electrode thereby freeing said drive spring to propel the electrode downward;
- a second high spot on said cam for urging said cam follower outward and said first end of said first lever upwards to support and move the electrode to a position just below said plunger; and
- a deep shoulder on said cam for releasing said cam follower rendering said tension spring effective to pull said first lever from support of the electrode and into engagement with said second lever forcing said second lever downward to propel the electrode into the percussive welding position.

References Cited

UNITED STATES PATENTS

| 2,330,055 | 9/1943 | Holloway | 219—86 |
| 2,809,271 | 10/1957 | Birchler | 219—79 |
| 2,809,274 | 10/1957 | Quinlan | 219—95 |
| 2,901,589 | 8/1959 | Spillar | 219—78 |
| 2,798,936 | 7/1957 | Quinlan | 219—96 |
| 2,129,845 | 9/1938 | King. | |
| 2,809,271 | 10/1957 | Birchler. | |
| 2,809,274 | 10/1957 | Quinlan. | |
| 2,901,589 | 8/1959 | Spillar. | |

JOSEPH V. TRUHE, Primary Examiner

MARTIN C. FLIESLER, Assistant Examiner